United States Patent [19]

Ecklesdafer

[11] Patent Number: 5,154,652
[45] Date of Patent: Oct. 13, 1992

[54] DRIVE SHAFT COUPLING

[76] Inventor: Eric J. Ecklesdafer, Box 36A, Rte. 300, Sudlersville, Md. 21668

[21] Appl. No.: 821,845

[22] Filed: Jan. 14, 1992

Related U.S. Application Data

[63] Continuation of Ser. No. 561,073, Aug. 1, 1990, abandoned.

[51] Int. Cl.⁵ .................................................. B63H 23/34
[52] U.S. Cl. ........................................ 440/83; 403/312
[58] Field of Search ........................... 440/83, 113; 403/310–313; 464/182, 170

[56] References Cited

U.S. PATENT DOCUMENTS

| | | | |
|---|---|---|---|
| 1,377,101 | 5/1921 | Sparling | 403/313 |
| 3,583,356 | 6/1971 | Barker | 403/312 |
| 3,851,983 | 12/1974 | MacKenzie | 440/83 |
| 4,469,465 | 9/1984 | Andrus | 403/312 |
| 4,534,746 | 8/1985 | Hausinger | 403/312 |

*Primary Examiner*—Jesûs D. Sotelo
*Attorney, Agent, or Firm*—J. W. Gipple

[57] ABSTRACT

A coupling is provided for releasably joining two abutting sections of a drive shaft such as used to drive an inboard power boat. An inner sleeve within the coupling is replaceable and permits one shaft to rotate relative to the other within the coupling if a predetermined torque setting is exceeded without damaging the coupling. The torque "breakaway" point for the coupling can be adjusted by tightening or loosening the bolts connecting the two halves of the coupling around the shafts.

3 Claims, 5 Drawing Sheets

DRIVE SHAFT COUPLING

This application is a continuation of application number 7/561,073, filed Aug. 1, 1990, now abandoned.

SUMMARY OF THE INVENTION

This invention is directed to an improved propeller shaft and coupling for the purpose of rigidly connecting and transmitting the rotation of an engine driven propeller shaft to a drive propeller shaft while maintaining correct relative position both radially and axially between the drive shaft and propeller shaft typically used on the propulsion system of inboard engine powered marine vessels.

BACKGROUND OF THE INVENTION

Heretofore, shaft couplings for inboard engine driven vessels have been utilized as a means of connecting shorter shaft end to end to span the distance between the transmission and the propeller, the shaft connected to the transmission being the main or driven shaft and the shaft connected to the propeller being the tail or drive shaft. In case of torsional overloading of the propulsion system, such as the propeller hitting a submerged object while under power, there have been no previous coupling designs that allow for the forced rotation of the shaft within the coupling without destroying the coupling body and the shafts being joined thereby subjecting the shafts and the coupling body to permanent damage if either shafts were to rotate within the coupling.

The present invention utilizes a replaceable sleeve between the coupling body and the shafts being joined. This feature makes this coupling field repairable, whereas the previous designs had to be replaced entirely. Another feature of this improved coupling is the method used to keep the shafts locked inside the coupling.

U.S. Pat. No. 3,583,356 to Milton T. Barker addresses the problem of the shaft pulling out of the coupling when the propulsion system was operated in reverse. Barker's solution was the addition of disks fastened to the ends of the shafts being joined. The immediate disadvantages of the discs are the additional machining required and the larger diameter coupling body necessary to accommodate the disks. It is possible that if either shaft were to rotate within the coupling, the screw attaching the disc to the shaft would loosen from the shaft rendering the disks ineffective in keeping the shaft within the coupling.

The improved coupling of the present invention utilizes the mounting screws to mate with a single circumferential groove, machined near the end of each shaft to be joined, to keep the shafts in the coupling should either shaft be forced to spin inside the coupling.

DETAILED DESCRIPTION OF THE INVENTION

In accordance with the present invention, a bifurcated drive shaft is provided comprising a first elongated shaft adapted to abut and turn a second elongated shaft disposed in longitudinal alignment therewith; each of the shafts being provided with a circumferential groove proximate their respective abutting ends. The shafts are releasably joined to each other by an outer sleeve comprising two longitudinally divided outer halves which surround the abutting shafts ends and are joined together by a plurality of elongated fasteners which are disposed transverse to the longitudinal axis of the shafts and on opposing sides thereof. Two of the elongated fasteners tangentially engage each of the circumferential grooves on opposing sides of each shaft to prevent longitudinal displacement of the shafts relative to one another. A second, longitudinally divided inner sleeve is disposed concentrically between the outer halves and the shafts such that rotation of the first shaft is imparted to the second shaft.

The invention including a preferred embodiment thereof and its modification will however, be more fully appreciated by having specific reference to the appended drawings.

Figure 1:
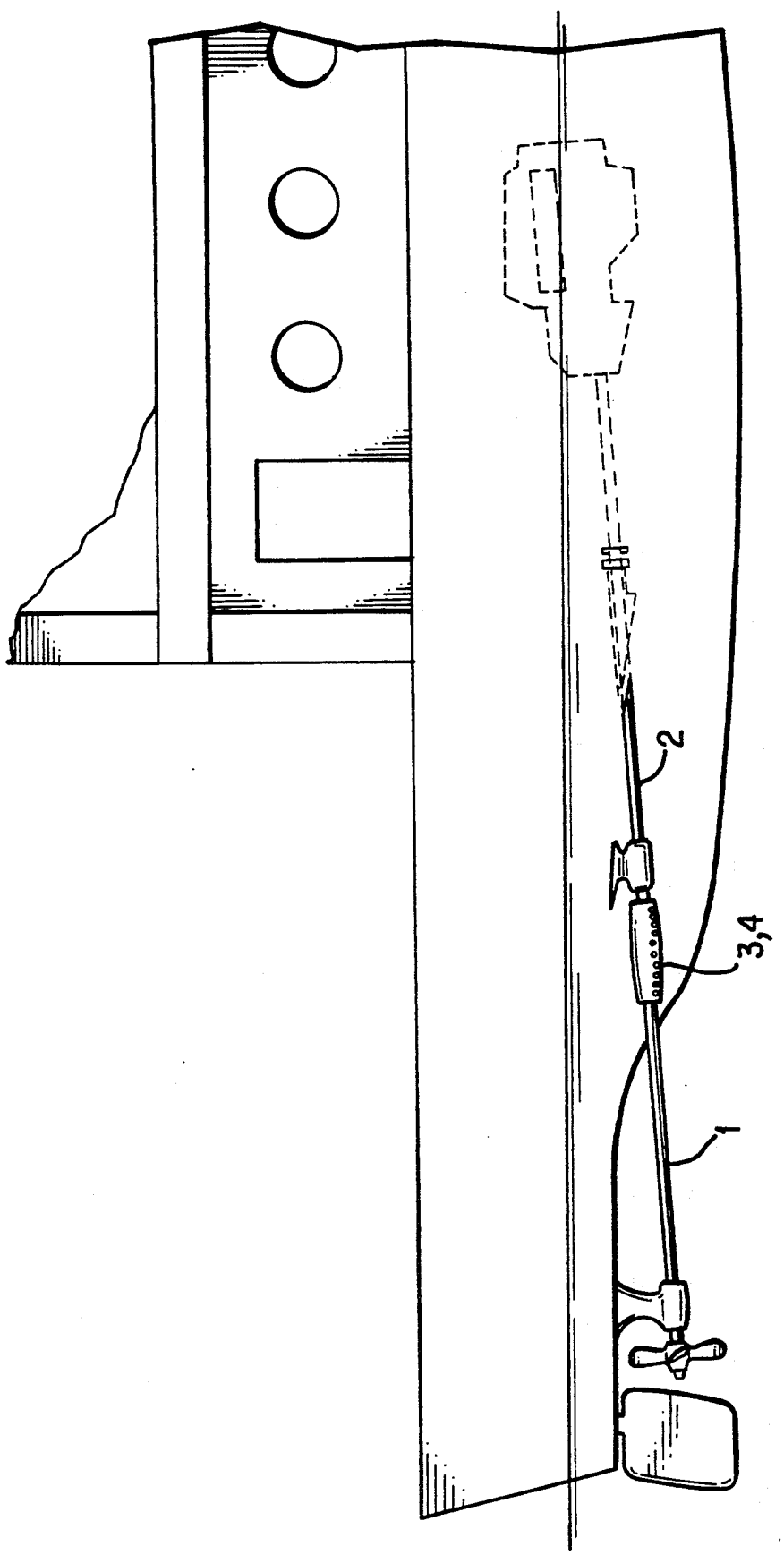
FIG. 1 is a side view illustrating installation of the coupling of the invention on a boat drive shaft
Figure 2:
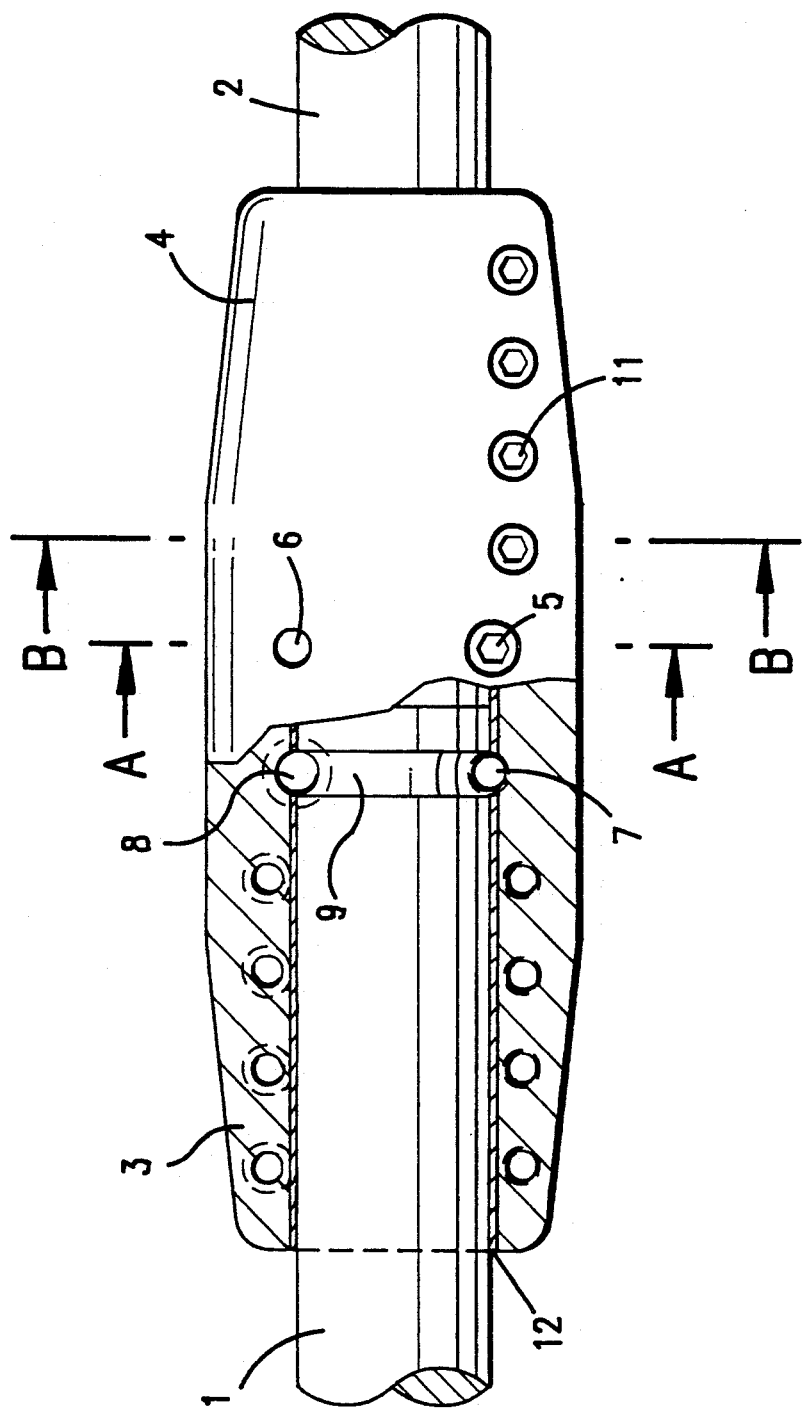
FIG. 2 is a partially cut-away detailed side view of the coupling of the invention FIG. 3 (a,b) is a crossection view along A—A of the coupling and shaft of the invention before and after engagement around the shafts FIG. 4 (a,b) is a crossection view along B—B of the coupling and shaft of the invention before and after engagement around the shaft
Figure 3A:
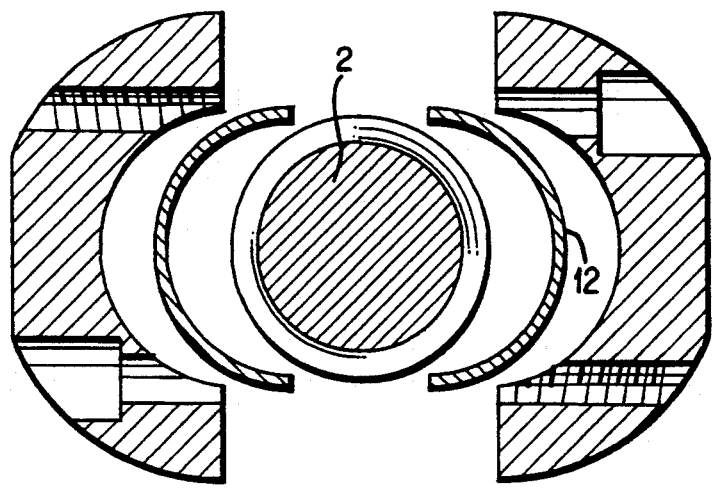
Figure 3B:
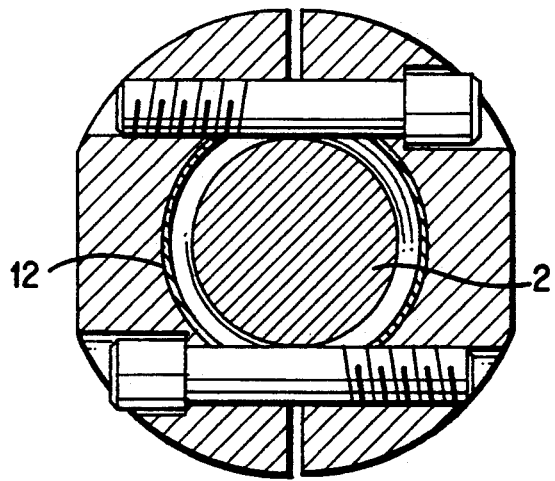
Figure 4A:
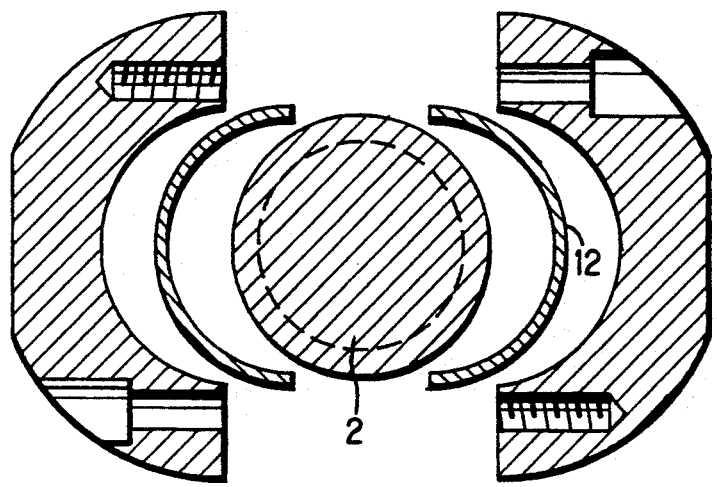
Figure 4B:
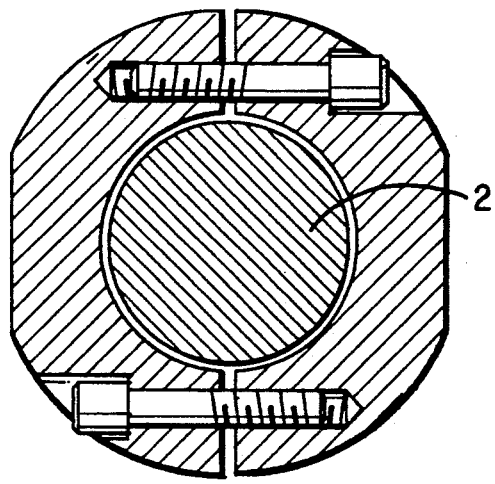
Figure 5:
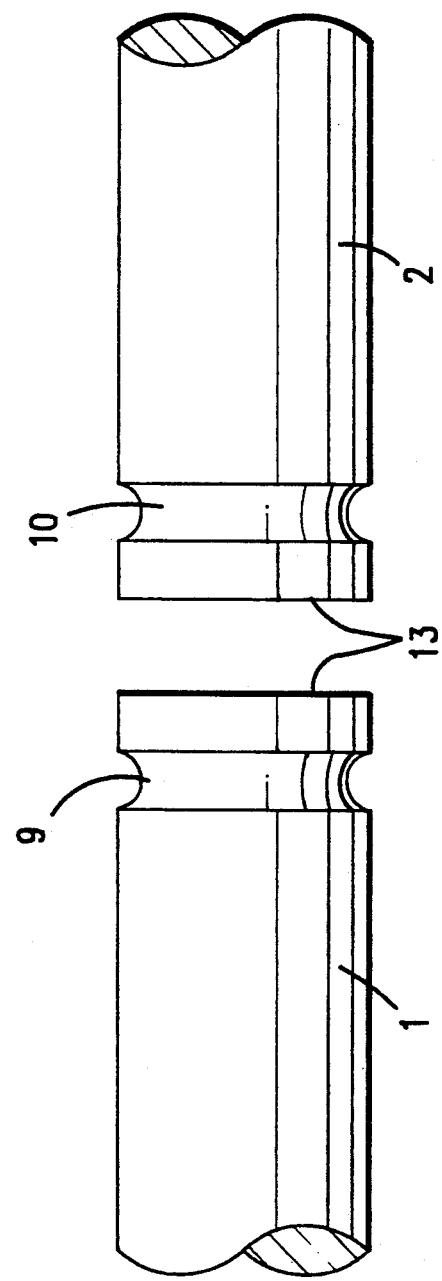
FIG. 5 is a side view of the abutting ends of the drive and main shaft

Directing attention to FIGS. 1-5 of the drawings, a marine propeller shaft coupling which is comprised of two identical halves (3,4), a series of cap screws (5,11) to hold the two halves (3,4) together, and an internally positioned sleeve (12), when assembled forms a rigid joint between the main shaft (1) and the tail shaft (2). The mounting screws (5,11) that pass through holes in one half of the coupling (3) and screw into threaded holes (7) in the other half of the coupling (4) are tightened to a specific torque such that the coupling will transmit rotation from the main shaft (1) into the tail shaft (2) by frictional forces created by the compression of the two coupling halves (3,4) upon the shafts (1,2). By changing the amount of torque applied to the mounting bolts (5,11), the amount of torque the coupling will transmit from the main shaft (1) to the tail shaft (2) will change accordingly. There are two sizes of mounting bolts (5,11) utilized to clamp the two coupling halves (3,4) together. The outer mounting bolts (11) are smaller diameter cap screws which are inserted through one coupling half and thread into the other coupling half without intersecting the shaft. The inner mounting bolts (5) are larger in diameter than the outer mounting bolts (11) and are located near the center of the coupling body. The position of the inner mounting screws (5) differ from the position of the outer mounting screws (11) in that they intersect the shaft tangent to its diameter at a depth of half the diameter of the inner mounting screw shank. The circumferential grooves (9,10) located near the ends of the main shaft (1) and the tail shaft (2) engage with the four inner mounting bolts (5) to form a lock to keep the main shaft (1) and the tail shaft (2) contained within the coupling. A sleeve (12) is located between the shafts (1,2) and the coupling body (3,4), the full length of the coupling body, such that if one or both shafts spin inside the coupling neither the shafts nor coupling body will be damaged. The sleeve (12) is a consumable and replaceable component of the coupling and is made of a softer material than either the shafts or the coupling body, making the coupling field repairable after the rotation within the coupling of one or both shafts due to torsional overloading of the propulsion system. By relying upon the friction forces between the shafts and the coupling to transfer torque from the main shaft (1) to the tail shaft (2) the conventional keyways and key are not necessary. By not having to machine a keyway into the coupling body a smaller, stronger, more streamlined coupling is the result. The tapered ends of the coupling body are designed to reduce the amount of drag caused by the coupling when the boat is in motion.

What is claimed is:

1. A bifurcated drive shaft comprising in combination a first elongated shaft adapted to abut and turn a second elongated shaft disposed in longitudinal alignment therewith; each of said shafts being provided with a circumferential groove proximate their respective abutting ends; said shafts being releasable joined to each other by an outer sleeve comprising two longitudinally divided outer halves which surround and frictionally engage said abutting shaft ends and are joined together by a plurality of elongated fastener means disposed transverse to the longitudinal axis of said shafts and on opposing sides thereof; two of said elongated fastener means tangentially engaging each of said circumferential grooves on opposing sides of each shaft to prevent longitudinal displacement of said shafts relative to on another; a second, replaceable, protective inner sleeve means longitudinally divided into two sections and disposed concentrically between said outer halves and said shafts to permit either of said shafts to turn within said sleeve means independently if the relative torque differential between the shafts exceeds a predetermined value and such that tightening of said fastener means frictionally engages said inner and outer sleeves around said shafts such that rotation of said first shaft is imparted to said second shaft.

2. The drive shaft of claim 1 wherein said fastener means are bolts.

3. The drive shaft of claim 1 wherein additional fastener means are provided to join said outer halves of said sleeve which do not engage either of said shafts or the grooves therein.

* * * * *